United States Patent [19]

Schneider et al.

[11] Patent Number: 4,692,425

[45] Date of Patent: Sep. 8, 1987

[54] CATALYST FOR REDUCING THE NITROGEN OXIDE CONTENT OF FLUE GASES

[75] Inventors: Michael Schneider, Ottobrunn-Riemerling; Karl Kochloefl, Moosburg; Gerd Maletz, Landshut; Hans J. Wernicke, Geretsried, all of Fed. Rep. of Germany

[73] Assignee: Süd-Chemie Aktiengesellschaft, Munich, Fed. Rep. of Germany

[21] Appl. No.: 880,168

[22] Filed: Jun. 30, 1986

[30] Foreign Application Priority Data

Jul. 5, 1985 [DE] Fed. Rep. of Germany ....... 3524160

[51] Int. Cl.$^4$ ............................................. B01J 20/12
[52] U.S. Cl. ..................................................... 502/81
[58] Field of Search ..................... 502/81, 82, 83, 408; 423/239, 239 A

[56] References Cited

U.S. PATENT DOCUMENTS

| | | | |
|---|---|---|---|
| 2,449,891 | 9/1948 | Gary et al. | 502/81 |
| 2,934,504 | 4/1960 | Talvenheimo | 502/83 |
| 3,901,826 | 8/1975 | Hofstadt et al. | 502/83 |
| 4,113,839 | 9/1978 | Maki et al. | 423/239 |

FOREIGN PATENT DOCUMENTS

| | | | |
|---|---|---|---|
| 29466 | 3/1977 | Japan | 423/239 A |
| 65283 | 6/1978 | Japan | 423/239 |

*Primary Examiner*—Carl F. Dees
*Attorney, Agent, or Firm*—William R. Price

[57] ABSTRACT

A catalyst for lowering the nitrogen oxide content of flue gases contains as the active component an acid-activated layer silicate, in particular of the smectite type, whose layered structure is to a large extent intact after the acid treatment.

18 Claims, No Drawings

CATALYST FOR REDUCING THE NITROGEN OXIDE CONTENT OF FLUE GASES

BACKGROUND OF THE INVENTION

It is known that combustion of fossil fuels, such as petroleum, natural gas or coal, produces nitrogen oxides ($NO_x$) which get into the atmosphere and which are harmful to the environment. The nitrogen oxides are regarded to be co-responsible for forest damage through "acid rain" as well as for the formation of "photochemical smog." Accordingly, there is great interest in reducing the $NO_x$ content of combustion gases. Flue gases are understood to include both those from furnace installations and those from internal combustion engines.

It has long been known that nitrogen oxides can be transformed into $N_2$ and $H_2O$ selectively by $NH_3$, i.e. in the presence of an excess of oxygen. Also, several catalysts for this reaction are already known.

DESCRIPTION OF THE PRIOR ART

The known $NO_x$ reduction catalysts involve predominantly heavy metal-containing systems. German Patent No. 2,458,888 describes, for example, the combination of $TiO_2$ with oxides of the metals vanadium, molybdenum, tungsten, nickel, cobalt, uranium, etc. The activity of $NO_x$ reduction catalysts decreases continuously with increasing length of use under the operating conditions typical for this application, they must be replaced rather frequently. The spent catalysts, which contain concentrations of toxic, heavy metal compounds, must be regenerated in a costly manner or must be disposed of subject to strict regulations. In view of the large quantities of catalyst required for $NO_x$ removal from flue gases, the danger of secondary environmental pollution is substantial.

The use of molecular sieves for catalyzing the reduction of $NO_x$ with $NH_3$ is also known. Thus, for example, according to DE-OS No. 3,000,383, a clinoptilolite in hydrogen form is used as catalyst, obtained by ion exchange of a naturally occurring clinoptilolite with an ammonium nitrate solution and subsequent washing with a strong acid.

Further, the German Disclosure DE-OS No. 33 28 653, describes a catalyst consisting of a ceramic molecular sieve, having interstitial openings with cross-sectional diameters encompassing the critical molecule diameters of both ammonia and nitrogen, (i.e., below that of ammonia and above that of nitrogen).

The catalytic activity of these molecular sieve catalysts, therefore, depends on certain pore structures. For these catalysts, the danger exists that at high reaction temperatures, under the action of the water vapor contained in flue gases in high concentration, the crystal structure will be impaired, while at low temperatures the ready absorption of the water vapor leads to reduction of the activity. A serious disadvantage appears to be additionally that with the use of molecular sieves such as H-mordenite and H-clinoptilolite, the pollutant $N_2O$ is formed in considerable concentration. This is reported in the publication of J. R. Kiovsky, P. B. Koradla and C. T. Lin in *Ind. Eng. Chem. Prod. Res. Dev.* 19 (1980) 218.

SUMMARY OF THE INVENTION

It is, therefore, the object of the invention to provide a catalyst for lowering the nitrogen oxide content of flue gases, which is free from toxic heavy metal compounds, so that secondary damage to the environment is ruled out, and which in the reaction of nitrogen oxides with hydrogen-containing reducing agents, such as $NH_3$, promotes the exclusive formation of $N_2$ and $H_2O$, and which moreover can be produced from raw material of natural origin available in large quantities in a simple manner. Another object is to increase the stability of the catalysts towards sulfur oxides ($SO_x$).

This problem is solved surprisingly by a catalyst which contains as active component an acid-activated layer silicate whose layered structure is to a large extent intact.

Preferably, the active component is an acid-activated silicate with three-layer structure (three-layer silicate) with the following features:

(a) the three-layer silicate has a cation exchange capacity of $\geq 30$ mVal/100 g before the acid activation;

(b) the acid activation reduces the concentration of the intermediate layer cations and increases the BET surface by at least 15% (preferably by at least 50%), with reference to the BET surface of the three-layer silicate before the acid activation.

DESCRIPTION OF THE PREFERRED EMBODIMENT

In contrast to the molecular sieve catalysts, with these catalysts, the reaction takes place, not within the three-dimensional pore structure, but probably at the planes of the two-dimensional silicate layer structure.

It is understood that "acid activation" of the layered silicate involves a treatment which goes beyond the exchange of the mono- or bi-valent cations on the interstitial sites by hydrogen ions. It has been found, in fact, that when using layered silicates in which only such an ion exchange has taken place, the catalysts do not have sufficiently high activity. Further, catalysts which had been obtained with the use of natural layered silicates in the H form do not give sufficiently high activities and are not stable in the presence of $SO_x$.

The acid activation leads to an increase of the specific surface area, which is generally determined by the BET method. On the other hand, the acid activation must not be conducted so far that amorphous silicic acid predominates, since in this case a clear decrease of the catalytic activity results.

The use of a three-layer silicate which before the acid activation has a cation exchange capacity of $\geq 30$ mVal/100 g is especially advantageous. The reason why these starting materials produce especially active catalysts is not yet fully understood. It may be attributed to the especially favorable crystal structure of the acid-activate three-layer silicates.

The specific surface of the acid-activated layered silicates used according to the invention is preferably between about 80 and 400 $m^2/g$.

Additionally, with the catalysts of the invention, the acid activation reduces the concentration of the interlayer cations (in particular Na, K, Mg and Ca) by at least 12%, as compared with the concentration of the interlayer cations in the layered silicate prior to the acid activation.

During the acid activation, the cations are removed from the interstitial sites. Upon further acid activation, cations are removed from lattice sites, in particular aluminum and iron. This is accompanied by a modification of the silicate structure. The silicate layers are attacked by the acid from the edges. Probably SiO₄ tetrahedral bands are formed, which, due to a certain wedge effect, cause a disorientation of the layered silicate.

The acid degradation is generally conducted until the $SiO_2$ content of the acid-activated layered silicate has increased by at least 5%, preferably by at least 10%. Depending upon the starting material, the $SiO_2$ content will then be 50 to 90%, preferably 65 to 80% by weight. The acid degradation is not conducted to the point that only X-ray amorphous $SiO_2$ remains. Rather, the acid digestion is interrupted when there is a certain degree of crystallinity of the acid-activated layered silicate, or respectively, a proportion of not more than 45% of extractable silicic matter. The proportion of extractable silicic matter is determined by treating the dried filter cake obtained after the acid digestion reaction with a soda solution according to the procedure described by Y. Otsubo, *Jap. J. Chem.* 72 (1951) 573.

Preferably, the proportion of the pore volume of the macropores having diameters of >80 mm is at least 25%. The pore volume is determined by Hg porosimetry.

These layered silicates, which belong to the smectite type, are given special preference. Also, alumosilicates of the kaolinite type can be used as well.

The acid treatment for transforming the starting material into the catalyst according to the invention can be carried out in known manner, with the preferred use of aqueous mineral acids, such as hydrochloric acid or sulfuric acid. Alternatively, organic acids, such as formic and acetic acid may be used. The acids concentration is in the range of from 1 to 60% by weight, referred to the dry substance content, preferably in the range of from 10 to 40% by weight. A preceding wet classification of the raw material may prove advantageous. The acid-treated substance is optionally washed with acidulated water, whose pH is between 1 and 7, preferably between 2 and 4, filtered off and dried at temperatures between 50° and 200° C., preferably between 80° and 150° C.

The catalysts according to the invention are distinguished also by a high stability to sulfur oxides or to sulfuric acid, due to the acid activation of the layered silicate. It was found that untreated, H-ion-exchanged or alkali-activated layered silicates were subject to strong attack, either by sulfur oxides or by sulfuric acid, which led to mechanical destruction and to premature aging of the catalysts produced from these layered silicates.

On the other hand, catalysts which were produced with the use of amorphous silicic acid are indeed stable to sulfuric oxides and sulfuric acid, but their $NO_x$ activity is clearly inferior.

Preferably, an acid-activated, three-layer silicate of the smectite type, in particular of the montmorillonite type, is used. The most important montmorillonite-containing natural mineral is bentonite, which may be present in the form of calcium or sodium bentonite. Additional minerals of the smectite type are hectorite and nontronite.

The catalysts according to the invention can be applied as coatings on any support materials, including sheetmetal or metal mesh. But, as the catalysts of the invention involve relatively cheap substances, they are preferably used as bulk materials. Preferably, the active components are present as shaped bodies, more particularly as shaped bodies with a high geometric surface.

Further, the shaped bodies are preferably formed so that they offer as little flow resistance as possible to the flue gases. In catalysts which are to be used in furnace installations, this property is especially important to keep the pressure gradient as low as possible and to prevent separation of dust. The same applies to waste gas catalysts for internal combustion engines, where a high flow resistane would lead to a power drop of the engine.

Preferably, the shaped bodies are formed as tablets, rods, tubes, rings, saddles, star- or screen-shaped bodies or as honeycombs. The bodies can be obtained e.g. by pelletizing or extruding, optionally with addition of substances which increase the deformability and/or the mechanical stability. As additives for improving the deformability, there may be used, for example, mono- or polyvalent alcohols, salts predominantly of long-chain carboxylic acids (e.g. aluminum stearate), graphite and/or neutral bentonite. By "neutral" bentonites are understood according to the invention natural alkali or alkaline earth bentonites, as well as those bentonites which have been treated with acid of very low concentration.

As additives for increasing the mechanical stability, there may be used, for example, cements (e.g. portland cement or calcium aluminate cement) as well as hydrated silicic acid (as silica gel or as sol). However, such additions are not absolutely necessary for the production of the catalysts according to the invention.

Shaping is generally done with admixture of water or organic solvents, e.g. mono- or polyvalent alcohols.

The catylyst bodies may be calcined at temperatures of from 200° to 600° C., preferably at 300° to 500° C. Considerably higher temperatures may result in partial destruction of the crystal structure and hence in loss of activity.

A subject of the invention is further the use of the catalysts according to the invention for lowering the nitrogen oxide content of flue gases by reduction, preferably using $NH_3$ as the reducing agent. Alternatively, hydrogen or other hydrogen-containing reducing agents, such as low molecular weight alcohols and low molecular weight hydrocarbons, can be employed. In any case, $N_2$ and $H_2O$ are formed as reduction products. As nitrogen oxides ($NO_x$), the various oxygen compounds of nitrogen, e.g. $NO, N_2O_3, NO_2, N_2O_5$ are designated. However, primarily NO and $NO_2$ are involved, with NO predominating.

The $NO_x$ concentration of the waste gases to be purified may vary. It is generally in the range of from 100 ppm to 5% by volume. When $NH_3$ is used, the molar ratio $NH_3:NO_x$ is about 0.3 to 3, preferably 0.5 to 1.5 and can be adjusted by control measures in such a way that maximum $NO_x$ conversions at lowest possible $NH_3$ slip are achieved. The reducing agent ($NH_3$) may be metered in either in gaseous form or in the form of an aqueous solution.

The catalysts of the present invention are distinguished from the known catalysts by a more selective reaction of the ammonia used for the reduction of the nitrogen oxides. In known processes (especially at higher operating temperatures), a substantial proportion of the ammonia is not used for the desired $NO_x$ reduction, but is itself oxidized by the oxygen present in the waste gas. This results in an additional formation of nitrogen or even of nitrogen oxides or, in other words, reduces the $NO_x$ conversion between the reactor inlet and outlet and results in an unnecessary NH3 consumption.

All reactions normally used for gas phase heterogenously catalyzed reactions are suitable for the denitrogenation reaction, provided the structural features of the reactor permit the throughput of correspondingly high flue gas volume flows. Permissible space velocities (SV) are in the range of from 500 to 20,000, preferably between 1,000 and 10,000 liters of gas per hour and liter of catalyst, these space velocities referring to a gas at 0° C. and 1 bar. The space velocity is expressed below simply by the dimension $h^{-1}$. Suitable reaction temperatures are in the range from about 250° to 600° C., preferably from 300° to 500° C.

The efficiency of the catalysts with regard to elimination of nitrogen oxides from gas mixtures containing also oxygen and sulfur oxides among others is determined by contacting the catalyst with a gas stream which is passed through a tube electrically heated from the outside and containing this catalyst as a fixed bed. The gas mixture used had the following composition:
$O_2$: 3% by vol.,
$H_2O$: 10% by vol.,
NO: 750 vol-ppm,
$NO_2$: 50 vol-ppm,
$NH_3$: 800 vol-ppm,
$SO_2$: 600 vol-ppm,
$N_2$: difference relative to 100% by vol.

The concentration of the component NO and $NO_2$ was measured continuously before and after passing through the catalyst bulkbed by a calibrated analyzer (chemoluminescence method). As a measure of the activity of the catalysts, the indication of the degree of conversion of the components NO and $NO_2$ after adjustment of the stationary state is defined by the following equations:

$$\text{NO conversion } (C_{NO}) = \frac{c_{NO}^E - c_{NO}^A}{c_{NO}^E} \times 100 \, (\%)$$

$$\text{NO}_2 \text{ conversion } (C_{NO2}) = \frac{c_{NO2}^E - c_{NO2}^A}{c_{NO2}^E} \times 100 \, (\%)$$

Therein, the symbols $c_{NO}$ and $c_{NO2}$ designate the concentrations of NO and $NO_2$, the superscripts E and A referring to the state of the gas mixture before and after passage through the catalyst.

The preparation of the catalysts according to the invention is explained in Examples 1 and 2.

EXAMPLE 1

Two kg of a crude bentonite fraction obtained by hydroclassification in aqueous suspension and having a grain size of $\leq 50$ μm, a cation exchange capacity of 79 mVal/100 g, a BET surface of 69 m2/g and the composition:

| $SiO_2$ (%) | $Al_2O_3$ (%) | $Fe_2O_3$ (%) | CaO (%) | MgO (%) | $K_2O$ (%) | $Na_2O$ (%) |
|---|---|---|---|---|---|---|
| 61.9 | 17.6 | 5.9 | 6.7 | 5.1 | 1.5 | 0.3 | are mixed for 6 hours at 80° C. with 8 liters of an aqueous HCl solution. The HCl content was about 21% by weight, referred to the dry substance. After suction-filtering, the filter cake is washed amply with acidulated water (adjusted with HCl to pH 3.5). The obtained acid-activated bentonite has a BET surface of 210 m2/g. After addition of 40 ml glycerol, the product is ground in a ball mill and the resulting substance extruded to cylindrical compacts of a diameter of 3 mm. One dries at 120° C. and calcines for 2 hours at 200° C., 1 hour at 300° C. and 3 hours at 450° C.

The catalyst substance has the following composition:

| $SiO_2$ (%) | $Al_2O_3$ (%) | $Fe_2O_3$ (%) | CaO (%) | MgO (%) | $K_2O$ (%) | $Na_2O$ (%) |
|---|---|---|---|---|---|---|
| 74.8 | 17.1 | 4.6 | 0.2 | 2.1 | 0.9 | 0.3 |

From the composition before and after the acid activation, a decrease in concentration of the interlayer cations by 75% is calculated.

The extruded compacts, reduced to a length of about 5 mm are subjected to an activity test under the conditions described:

| SV ($h^{-1}$) | T (°C.) | $C_{NO}$ (%) | $C_{NO2}$ (%) |
|---|---|---|---|
| 5000 | 300 | 46 | 90 |
| 5000 | 350 | 64 | 100 |
| 5000 | 400 | 73 | 100 |
| 5000 | 450 | 72 | 100 |

$N_2O$ in detectable concentration was not formed.

EXAMPLE 2

The procedure of Example 1 was repeated with the modification that the HCl content was now 34% by weight, referred to the dry substance, instead of 21%. The catalyst substance had the following composition:

| $SiO_2$ (%) | $Al_2O_3$ (%) | $Fe_2O_3$ (%) | CaO (%) | MgO (%) | $K_2O$ (%) | $Na_2O$ (%) |
|---|---|---|---|---|---|---|
| 76.5 | 15.8 | 4.3 | 0.2 | 1.9 | 0.9 | 0.3 |

The BET surface of the acid-activated bentonite was 221 m2/g.

The extruded compacts reduced to a length of about 5 mm are subjected to an activity test under the described conditions:

| SV ($h^{-1}$) | T (°C.) | $C_{NO}$ (%) | $C_{NO2}$ (%) |
|---|---|---|---|
| 5000 | 350 | 63 | 100 |
| 5000 | 400 | 72 | 100 |
| 5000 | 450 | 71 | 100 |

COMPARISON EXAMPLE

The crude bentonite fraction of Example 1, not acidactivated, was ground with glycerol in a ball mill as indicated in Example 1, whereupon the resulting substance was extruded to cylindrical compacts of a diameter of 3 mm. The compacts were dried at 120° C., calcined for 2 hours at 200° C., 1 hour at 300° C. and 3 hours at 450° C.

The catalyst substance has the composition indicated in Example 1.

The extruded compacts, reduced to a length of about 5 mm, are subjected to an activity test under the described conditions:

| SV ($h^{-1}$) | T (°C.) | $c_{NO}$ (%) | $c_{NO_2}$ (%) |
|---|---|---|---|
| 5000 | 350 | 22 | <80 |
| 5000 | 400 | 23 | <80 |
| 5000 | 450 | 21 | <80 |

We claim:

1. A catalyst, active for the reduction of $NO_x$ in flue gases, which comprises an acid-activated, three layer silicate, in which the three layered structure is substantially intact after acid activation.

2. A catalyst, as defined in claim 1, in which said multilayer silicate has a cation exchange capacity of $\geq 30$ mVal/100 g before acid activation.

3. A catalyst, as defined in claim 1, in which the acid activation of said layer silicate has increased the BET surface area by at least 15%, as compared to the BET surface area of said layer silicate prior to acid activation.

4. A catalyst, as defined in claim 1, in which the interlayer cation concentration of the acid-activated layer silicate has been reduced, relative to the concentration of interlayer cations of the layer silicate prior to acid activation.

5. A catalyst, as defined in claim 1, in which the BET surface area of the acid-activated layer silicate has been increased by at least 50%, relative to the BET surface area of the layer silicate prior to said activation.

6. A catalyst, as defined in claim 4, in which the interlayer cation concentration of the acid-activated layer silicate has been reduced by at least 12%.

7. A catalyst, as defined in claim 1, in which the acid-activated layer silicate is a smectite.

8. A catalyst, as defined in claim 1, in which the acid-activated layer silicate is a montmorillonite.

9. A catalyst, as defined in claim 1, in which the $SiO_2$ content of the acid-activated layer silicate is increased by at least 5% over that of the starting material.

10. A catalyst, as defined in claim 1, in which the $SiO_2$ content of the acid-activated layer silicate is increased by at least 10% over that of the starting material.

11. A catalyst, as defined in claim 1, in which the catalyst is in the form of a shaped body, having a high geometric surface and a low flow resistance, relative to flue gases.

12. A catalyst, as defined in claim 11, in which the catalyst is present in the shape of tablets, rings, saddles, rods, tubes, star-shaped bodies or as honeycombs.

13. A catalyst, as defined in claim 12, in which the shaped bodies have been produced by pelletizing or extrusion.

14. A catalyst, as defined in claim 11 in the form of shaped bodies, containing additives.

15. A catalyst, as defined in claim 14, in which said additives are selected from the group consisting of monovalent alcohols, polyvalent alcohols, salts of long-chain carboxylic acids, graphite and neutral bentonite.

16. A catalyst, as defined in claim 14, in which the additives are selected from the group consisting of cement or hydrated silicic acid.

17. A catalyst, as defined in claim 1, in which the shaped catalyst has been calcined at temperatures in the range of from 200° to 650° C.

18. A catalyst, as defined in claim 1, in which the catalyst has been calcined at a temperature in the range of from 300° to 500° C.

* * * * *